United States Patent [19]

Hagemann

[11] 4,047,148
[45] Sept. 6, 1977

[54] PISTON TYPE UNDERWATER SOUND GENERATOR

[75] Inventor: Julius Hagemann, Panama City, Fla.

[73] Assignee: The United States of America as represented by the Secretary of the Navy, Washington, D.C.

[21] Appl. No.: 568,682

[22] Filed: Feb. 29, 1956

[51] Int. Cl.² .................................... H04B 13/00
[52] U.S. Cl. .................................. 340/12 R; 116/27; 181/119; 254/172; 340/8 R
[58] Field of Search ............... 181/.53 C, .5, .51, 181/.52, 119, 120; 116/137 A, 27; 254/172; 340/9, 13, 8 R, 12 R, 137, 13, 137 A; 60/54.5; 89/1 A

[56] References Cited

U.S. PATENT DOCUMENTS

| 2,148,277 | 2/1939 | Rose | 254/172 |
| 2,587,848 | 3/1952 | Horsley et al. | 116/137 A |

*Primary Examiner*—Harold Tudor
*Attorney, Agent, or Firm*—George Sipkin; Rolla N. Carter

EXEMPLARY CLAIM

1. An apparatus for producing low frequency compressional waves under water which comprises two circular plates spaced in opposed parallel relation, a plurality of reciprocating fluid motors arranged in parallel between said plates, an independent fluid pump hydraulically connected to each of said motors for driving the same, a by-pass valve for each motor adjustable to vary the length of the stroke of such motor, a prime mover coupled to drive all of the pumps in synchronism, whereby the motors connected thereto reciprocate in unison to move said plates toward and away from each other at a frequency corresponding to the speed of the prime mover, and means for adjusting all of the by-pass valves in assembly, whereby the amplitude of oscillation of said plates is correspondingly varied.

3 Claims, 3 Drawing Figures

Julius Hagemann
INVENTOR

BY George Sipkin
Rolla N. Carter
ATTORNEYS

PISTON TYPE UNDERWATER SOUND GENERATOR

The invention described herein may be manufactured and used by or for the Government of the United States of America for governmental purposes without the payment of any royalties thereon or therefor.

The present invention relates to underwater acoustics and more particularly to the generation under water of high intensity low frequency sound by the periodic displacement of pistons. In the preferred embodiment the invention is exemplified by a piston displacement type noisemaker positively driven by a plurality of hydraulically powered reciprocating motors.

The sweeping of acoustic mines requires high intensity sounds at relatively low frequencies such as, for example, 10 to 20 cycles a second. Present equipment employed for this purpose have the pistons coupled to an eccentric driving mechanism the construction of which involves heavy foundations, high bearing loads, sturdy parallelogram linkages, counterweights, and the like, which add considerably to the overall weight of the equipment. This overall weight tends to become critical in that it complicates handling in operational use.

The primary object of the invention is to provide a piston type noisemaker having a simplified driving system making possible a robust construction with a reduction in bulk and weight.

Another object of the invention is the provision of a driving system for a piston type noisemaker which can be amplitude modulated and which automatically maintains the pistons in the desired parallel relation.

These and other objects of the invention will appear from the following description of the preferred embodiment thereof when read in connection with the accompanying drawing in which.

In accordance with the preferred embodiment of the invention selected for the purpose of disclosing the invention a plurality of double acting hydraulic cylinders mounted between diaphragm pistons are driven through suitable high pressure lines by double acting pumps so that each cylinder is driven by and is a slave to a pump individual thereto. A drive common to all of the pumps assures their being locked in phase so that the slave cylinders move in unison and by equal distances.

Figure 1:
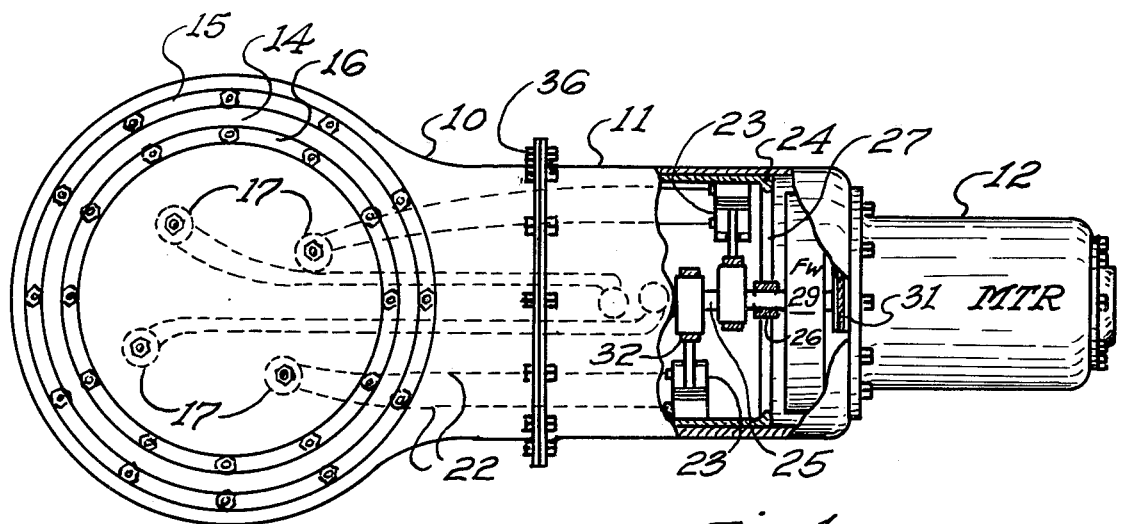
FIG. 1 is a diagrammatic top view partly in section of an apparatus embodying the invention.
Figure 2:
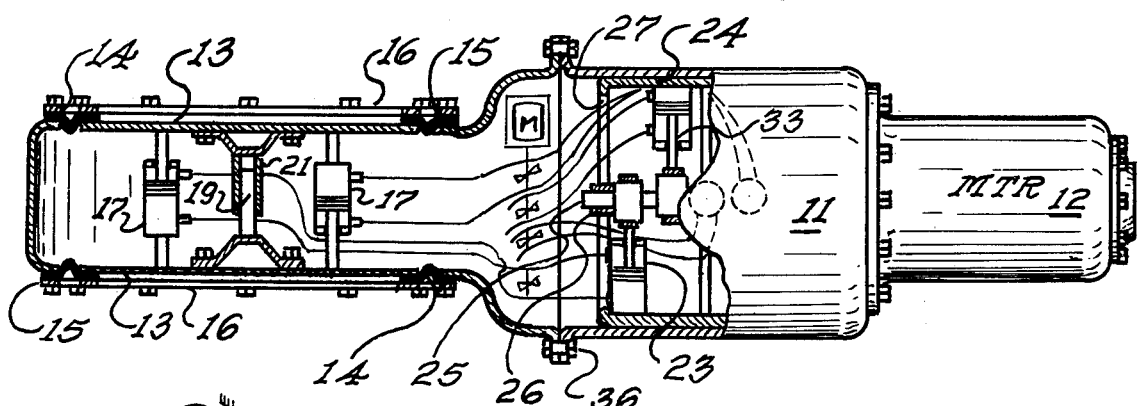
FIG. 2 is a diagrammatic side view partly in section of the apparatus shown in FIG. 1.
Figure 3:
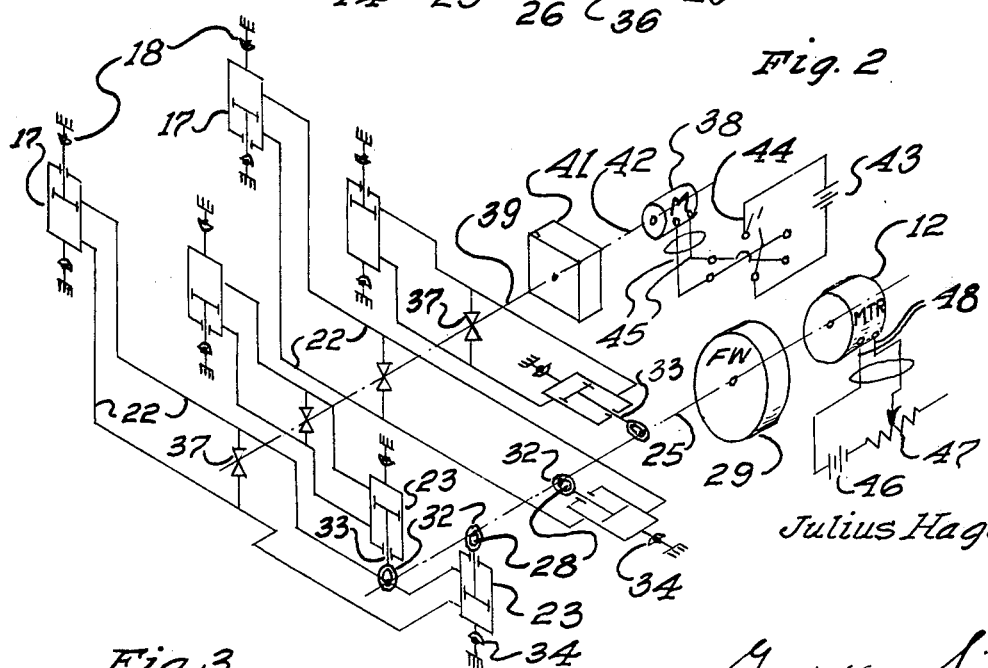
FIG. 3 shows schematically the drive system of the invention.

Considering now in greater detail the embodiment of the invention illustrated in the drawing, the entire assembly comprises three subassemblies consisting of a piston carrying frame 10, a pump and flywheel section 11, and a prime mover or motor unit 12. As best seen in FIG. 2 the frame 10 supports two diaphragm pistons 13, each of which comprises a circular rigid plate held in position by a flexible annular sealing member 14 secured to the frame 10 and the diaphragm pistons 13, respectively, by retaining rings 15 and 16. Mounted within the frame 10 and between the diaphragm pistons 13 are a plurality of hydraulic reciprocating motors here shown as double acting hydraulic cylinders 17 symmetrically arranged as indicated in FIG. 1. The cylinders 17 are connected to the piston diaphragms 13 in any suitable manner but as indicated in FIG. 3 universal joints such as spherical bearings 18 are preferred so as to render less critical the alignments required. In order to suppress any tendency of the cylinders 17 to deviate from their center line of motion perpendicular to the planes of the piston diaphragms 13 the guiding and centering function of the flexible sealing members 14 may be supplemented by a rod 19 and sleeve 21 suitably mounted in telescoping relation at the center of the diaphragm assembly 13. The elongated bearing surface between the rod 19 and the sleeve 21 functions to constrain the movement of the diaphragms 13 to the desired direction. The rod 19 and sleeve 21 also tend to maintain the diaphragms 13 in their desired parallel relation but with the forces involved in this type of equipment the rod and sleeve combination would have to be made extremely robust if it alone served this purpose. However, no unusual robustness is required with the arrangement of the invention in which the driving cylinders function in such time relation or synchronism as to maintain at all times the parallelism between the diaphragms 13.

The four hydraulic cylinders 17 are driven through suitable high pressure lines 22 by double acting pump cylinders 23 of a hydraulic pump assembly, the arrangement being such that each of the motor cylinders 17 is enslaved to an individual pump cylinder 23. The pump cylinders 23 are preferably, although not necessarily, identical with the motor cylinders 17 so as to have identical operating parameters. The four pump cylinders are shown as being arranged in equal spaced relation radially inside a strong ring mount 24 surrounding a drive shaft 25 which is journaled in bearings 26 supported by spider arms 27 carried by the ring mount 24. This ring mount 24 has an outside diameter substantially equal to the inside diameter of the tubular casing 11 of the pump and flywheel assembly thereby facilitating a firm mounting arrangement (not shown).

The shaft 25 is provided with four eccentrics 28 and a flywheel 29, and is adapted to be driven through a flexible coupling 31 by the motor 12. Each of the eccentrics 28 is individual to a pump cylinder 23 and is so oriented with the others as to assure phase coincidence of the push-pull driving forces for the pump cylinders 23. An eccentric strap 32 couples each eccentric 28 to the piston rod 33 of its associated pump cylinder 23 and, in the absence of a connecting rod or a captive cam the movement of the strap 32 transverse to the desired driving movement may be accepted as an angular movement of the entire cylinder 23 about a pivot mounting such as a spherical bearing 34 indicated in FIG. 3.

The abutting ends of the frame 10 and the casing 11 are flanged and detachably secured together by fastenings 36 and since no particular angular alignment is necessary either assembly may readily be replaced by another. This of course assumes that the flexible hoses 22 are provided with suitable couplings.

It is very desirable in sweeping acoustic mines to be able to modulate in amplitude the sound output, and the apparatus of the present invention is quite readily adapted to perform such a function. To this end the hydraulic lines 22 to each motor cylinder 17 are provided with a by-pass valve 37 and all of the valves 37 are arranged to be operated in unison as by a motor 38 through a shaft 39, a gear box 41, and the shaft 42 of the motor 38. The motor 38 is adapted to be selectively connected to a source of electric power 43, here shown as a battery, for rotation in either direction as through a reversing switch 44 and leads 45.

Although it is generally of less importance than is amplitude modulation, modulation of the frequency of the sound output of the device can be obtained by varying the speed of the drive motor 12 in any well-known manner. As indicated in FIG. 3 the drive motor 12 may be connected to a source of electric power 46 through an impedance 47 (adjustable for varying the speed of the motor 12) and leads 48.

It will be understood that the leads 45 to the control motor 38 and the leads 48 to the drive motor 12 will normally be incorporated in a cable so that when the apparatus of the invention is streamed in the ocean, as during a sweeping operation, the power sources 43 and 46 together with their respective control devices, viz., the switch 44 and the adjustable impedance 47, will remain on board the minesweeping vessel.

Inasmuch as the hydraulic cylinders and the hydraulic leads are pressure tight they offer no obstacle to the operation of the piston assembly in a free flooded condition. However, such operation would necessitate providing a compressible medium, such as thick foam rubber sheets, against which the diaphragm pistons can oscillate and would require a more powerful driving motor as the price for the resulting advantages. Accordingly it is preferred for reasons of power economy to maintain the internal pressure of the apparatus approximately equal to the external static head with compressed air in the usual manner.

Although the specific embodiment chosen for disclosing the invention has four double acting hydraulic units it will be appreciated that single acting units may be employed especially at the lower frequencies where the return time of the diaphragm pistons under the pressure of the surrounding water is compatible with the operating frequency. Also, a different number of units may be used and when a larger number are employed some advantages accrue such as the possibility of operating at a lower hydraulic pressure or of using smaller units.

As an example of the magnitude of the dimensions and forces involved in an apparatus which will sweep a path of acceptable width, an apparatus as above described having diaphragm pistons 27 inches in diameter the maximum mass forces which have to be overcome in driving the system at 30 cycles per second for a total excursion per piston of one-quarter of an inch are of the order of 3,200 kilograms (7,000 lbs). If six 1.5 inch bore, 0.75 inch rod hydraulic cylinders are used they would have to be operated at a maximum of some 900 pounds per square inch.

The invention has been disclosed in sufficient detail to enable one skilled in the art to practice it. Many details of design and manufacture have not been described since these are optional and their inclusion would tend to obscure rather than to clarify the real invention. For instance, there are several well-known arrangements for replacing leakage of hydraulic fluid, for compensating for initial pressure filling of the cylinders and the hose lines, etc., available to one skilled in art.

What is claimed is:

1. An apparatus for producing low frequency compressional waves under water which comprises two circular plates spaced in opposed parallel relation, a plurality of reciprocating fluid motors arranged in parallel between said plates, an independent fluid pump hydraulically connected to each of said motors for driving the same, a by-pass valve for each motor adjustable to vary the length of the stroke of such motor, a prime mover coupled to drive all of the pumps in synchronism, whereby the motors connected thereto reciprocate in unison to move said plates toward and away from each other at a frequency corresponding to the speed of the prime mover, and means for adjusting all of the by-pass valves in assembly, whereby the amplitude of oscillation of said plates in correspondingly varied.

2. Apparatus for generating sound under water comprising a frame, two equal area plates of rigid material resiliently mounted in spaced parallel relation on the frame, a plurality of hydraulic reciprocating motors orthogonally mounted between and so connected to the plates that the reciprocating movement of each of said motors is directly transmitted to the plates to vary their spacing, a plurality of hydraulic pumps, hydraulic lines connecting each pump to a separate motor, whereby each motor is enslaved to an individual pump, and means for driving all of the pumps in synchronism.

3. Apparatus in accordance with claim 2 wherein each set of hydraulic lines connecting a pump and motor is provided with a shunt line containing a valve and all of the valves are similarly connected to a common control shaft so that movement of the control shaft adjusts all of the valves equally.

* * * * *